No. 859,631. PATENTED JULY 9, 1907.
C. B. TILEY.
PNEUMATIC TIRE.
APPLICATION FILED APR. 9, 1906.

Witnesses
J. F. Shumway
Clara L. Weed

Curtis B. Tiley
Inventor
by Seymour & Earle
Atty.

UNITED STATES PATENT OFFICE.

CURTIS B. TILEY, OF NEW HAVEN, CONNECTICUT.

PNEUMATIC TIRE.

No. 859,631.      Specification of Letters Patent.      Patented July 9, 1907.

Application filed April 9, 1906. Serial No. 310,769.

*To all whom it may concern:*

Be it known that I, CURTIS B. TILEY, a citizen of the United States, residing at New Haven, in the county of New Haven and State of Connecticut, have invented a new and useful Improvement in Pneumatic Tires; and I do hereby declare the following, when taken in connection with the accompanying drawings, and the letters of reference marked thereon, to be a full, clear, and exact description of the same, and which said drawings constitute part of this specification, and represent, in—

Figure 1:
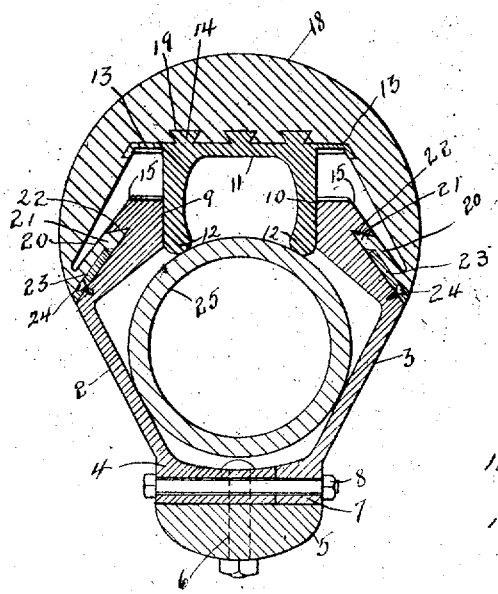
Figure 2:
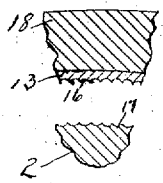
Figure 3:
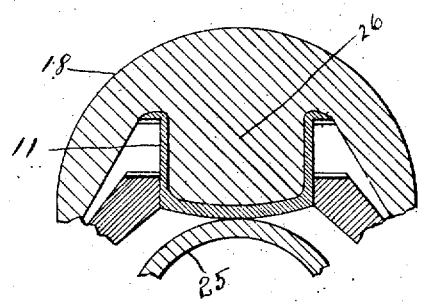

Figure 1 a sectional view of a tire constructed in accordance with my invention. Fig. 2 a broken longitudinal section showing the corrugations in the rim and plates. Fig. 3 a broken sectional view illustrating the modified form of rim.

This invention relates to an improvement in pneumatic tires and particularly to such as guard or protect the inflated or pneumatic tube so as to prevent the puncturing thereof by contact with any sharp edge passing through the outer tire, the object being a simple arrangement of parts which permits of ready access to the inner pneumatic tube, which positively prevents any edge cutting the tire from touching the inner pneumatic tube and which, furthermore, provides a tire which may be run with safety should the pneumatic tube become deflated; and the invention consists in the construction as hereinafter described and particularly recited in the claims.

In carrying out my invention I employ two plates 2, 3, the plate 2 having a base 4 slightly wider than half the width of the felly 5 to which it is attached by bolts 6, while the plate 3 has a base 7 which is connected with the base 4 by bolts 8 so that the plate 3 may be readily removed. These plates extend outward from the base and thence inward, and the inner faces 9 and 10 stand parallel with each other. Located between the faces 9 and 10 and fitting them closely is an inwardly opening arched rim 11 the inner edges 12 being rounded. On each side at the outer edge the rim is formed with horizontally extending flanges 13, and preferably formed in its outer face with dovetailed ribs 14. The projection of the flanges 13 corresponds to the outer edge 15 of the plates 2 and 3, and preferably and as clearly shown in Fig. 2 of the drawings, the inner faces of the flanges 13 are formed with corrugations 16, and the edges 15 of the plates 2 and 3 are formed with similar corrugations 17 for the purpose as will hereinafter appear. The outer tire 18 is secured to the rim 11 in any preferred way, but if the rim is provided with the dovetailed ribs 14 as described, the tire will have corresponding grooves 19 to interlock therewith. The tire, which is substantially semicircular in cross section, has at its edges inwardly turned flaps 20 terminating in ribs 21 which set into grooves 22 formed in the outer faces of the upper ends of the plates 2 and 3, and these ribs are locked in engagement with the plates by clenchers 23 secured to the plates 2 and 3 by screws 24 so that by removing the clenchers 23 the outer tire may be removed. Between the plates and within the rim 11 is the usual pneumatic tube 25. If this pneumatic tube be inflated, it will force the rim 11 outward, and hence hold the tire in an extended position, the arch of the rim providing ample space for the expansion of the inner tube. The rim being of metal and bearing against the faces 9 and 10 of the plates, will readily slide therein as the pneumatic tube is compressed, and will give sufficient rigidity to the outer tire to prevent its rocking. Should the inner pneumatic tube become deflated the rim 11 will, as the wheel revolves, be forced inward between the plates so that the flanges 13 bear upon the outer edges 15 of the plates, and if so, the corrugations 16 and 17 will interlock and prevent the tire from creeping, and at the same time give a sufficient bearing so that the vehicle may be run without danger of cutting the tire. By removing the clenchers 23 the tire may be readily replaced, and by removing the plate 3 ready access may be had to the inner pneumatic tube should it be necessary to repair or replace it.

Instead of having the rim open inward as shown in Fig. 1 of the drawings, it may be reversed, as shown in Fig. 3 of the drawings, in which case the central portion 26 of the tire may extend down into the rim and the inner face of the rim will bear upon the inner pneumatic tube so as to protect the same as effectually as before described.

I claim:—

1. The combination with a wheel-felly, of a pneumatic tire comprising two plates adapted to be secured to the felly and projecting outward therefrom, an arched metal rim located between the outer edges of said plates and adapted to move radially between them, an outer tire engaged with said rim and connected with said plates, substantially as described.

2. A pneumatic tire comprising two plates, an arched rim arranged between the inner faces of the outer edges of said plates said rim formed at its outer edges with horizontally extending flanges, and an outer tire secured to said rim and to said plates, substantially as described.

3. A pneumatic tire comprising two plates the inner faces of the outer edges arranged parallel with each other, a rim located between the outer edges of said plates, said rim formed at its outer end with horizontally extending flanges adapted to coact with the outer edges of said plates, an outer tire secured to said rim and provided at its edges with inwardly turned flaps which are connected to the outer faces of said plates, substantially as described.

4. A pneumatic tire comprising two plates having the inner faces of the outer edges arranged parallel with each other and formed with grooves in their outer faces, a metal rim located between said inner faces of the plates, an outer tire connected with said rim and formed at its edges with inwardly turned flaps having enlarged ribs adapted to enter the grooves in the outer faces of said plates, and clenchers secured to said plates and engaging said ribs whereby the tire is connected with said plates, substantially as described.

5. A pneumatic tire comprising two plates, having the inner faces of the outer edges arranged parallel with each other, an arched rim located between said plates and adapted to move radially between them, the sides of the arch extending inward, and a tire connected with said rim and with said plates, substantially as described.

6. A pneumatic tire comprising two plates having the inner faces of the outer edges arranged parallel with each other and having their outer edges corrugated, an arched rim located between said plates and adapted to move radially between them, said rim formed at its outer edge with horizontally extending flanges the inner faces of said flanges corrugated, and an outer tire secured to said rim and plates, substantially as described.

In testimony whereof, I have signed this specification in the presence of two subscribing witnesses.

CURTIS B. TILEY.

Witnesses:
FREDERIC C. EARLE,
CLARA L. WEED.